United States Patent [19]

Järvinen et al.

[11] Patent Number: 5,436,317
[45] Date of Patent: Jul. 25, 1995

[54] METHOD FOR PREPARING POLYANILINE

[75] Inventors: Hannele Järvinen, Vantaa; Jukka Laakso, Helsinki; Irma Auvinen, Tolkkinen; Eija Silvasti, Mantsala, all of Finland

[73] Assignee: Neste Oy, Espoo, Finland

[21] Appl. No.: 168,189

[22] Filed: Dec. 17, 1993

[30] Foreign Application Priority Data

Dec. 31, 1992 [FI] Finland ................... 925971

[51] Int. Cl.$^6$ .......................... C08G 73/00; H01B 1/00
[52] U.S. Cl. ................... 528/422; 252/500; 525/540; 528/210; 528/212; 528/214
[58] Field of Search ............... 528/422, 210, 212, 214; 525/540; 252/500

[56] References Cited

U.S. PATENT DOCUMENTS

| | | | |
|---|---|---|---|
| 4,615,829 | 10/1986 | Tamura et al. | 252/500 |
| 5,002,700 | 3/1991 | Otagawa et al. | 252/500 |
| 5,160,457 | 11/1992 | Elsenbaumer et al. | 252/500 |
| 5,324,453 | 6/1994 | Cao et al. | 252/500 |

FOREIGN PATENT DOCUMENTS

0497379 8/1992 European Pat. Off.
9111480 8/1991 WIPO.

OTHER PUBLICATIONS

A. Pron et al., *The Effect of the Oxidation Conditions on the Chemical Polymerization of Polyaniline*, Synthetic Metals, vol. 24, 1988, pp. 193–201.

S. P. Armes et al., *Optimum Reaction Conditions for the Polymerization of Aniline in Aqueous Solution by Ammonium Persulphate*, Synthetic Metals, vol. 22, 1988, pp. 385–393.

G. E. Asturias et al., *The Oxidation State of "Emeraldine" Base*, Synthetic Metals, vol. 29, 1989, pp. E157–E162.

Y. Cao et al., *Influence of chemical polymerization conditions on the properties of polyaniline*, Polymer, vol. 30, Dec., 1989, pp. 2305–2311.

*Primary Examiner*—Melvyn I. Marquis
*Assistant Examiner*—Shelley A. Dodson
*Attorney, Agent, or Firm*—Birch, Stewart, Kolasch & Birch

[57] ABSTRACT

A method for preparing a polyaniline having a desired molar mass. Control of the molar mass of the polyaniline is achieved in connection with an aniline polymerization reaction, by feeding aniline and an oxidizing agent participating in the polymerization reaction gradually into a polymerization vessel. By varying the feeding speeds of the aniline and the oxidizing agent, polyanilines having different molar masses are obtained.

13 Claims, 3 Drawing Sheets

METHOD FOR PREPARING POLYANILINE

FIELD OF THE INVENTION

The invention relates to a method of controlling, during polyaniline synthesis, the molecular weight of the emeraldine base form of polyaniline, which can be converted to a melt processable form of electrically conductive polyaniline. The invention can be used for producing a polyaniline having a desired molar mass, and consequently it is possible to produce a polyaniline polymer having a miscibility suitable, for example, for preparing polymer blends.

BACKGROUND OF THE INVENTION

Electrically conductive polymers are currently the subject to great interest worldwide. Metallic conductors and semiconductors can be replaced by these polymers in a variety of applications, such as batteries, transducers, switches, photocells, circuit boards, heating elements, antistatic protection (ESD), and electromagnetic protection (EMI). The advantages of electrically conductive polymers over metals include their light weight, their mechanical properties, their corrosion resistance, and lower costs of synthesis and cost of processing.

Electrically conductive plastics can roughly be divided into two categories: filled conductive plastics, in which a conductive filler such as carbon black, carbon fiber, metal powder, etc., is added to a thermosetting or thermoplastic resin, and intrinsically conductive plastics, which are based on polymers made conductive by an oxidation or reduction (doping) process.

The electrical conductivity of certain filled conductive plastics is dependent on the inter-particle contacts between the conductive filler particles. In general, approximately 10–50% wt. of a well dispersed filler is required to produce highly conductive plastics materials. However, such conductive plastics materials have certain disadvantages: their mechanical and some chemical properties are substantially degraded as the filler content increases and the polymer content decreases; their electrical conductivity is difficult to control, especially within the semiconductor regime; and stable and homogeneous dispersions of the fillers in the matrix plastic are often difficult to achieve.

Intrinsically conductive polymers can be produced from organic polymers having long chains made up of conjugated double bonds and heteroatoms. The polymers can be rendered electrically conductive by perturbing the $\pi$-electron and $\pi$-p-electron systems of the conjugated double bonds and heteroatoms by adding to the polymer certain doping agents which will act either as electron acceptors or electron donors. Thereby, electron holes or excess electrons are formed in the polymer chain, enabling electric current to travel along the conjugated chain.

Intrinsically conductive polymers have the advantage in easy modification of the conductivity as a function of the doping time, which is especially evident within low conductivity ranges. By contrast, for certain filled conductive plastics low conductivities are difficult to achieve. Examples of currently known intrinsically conductive polymers include polyacetylene, poly-p-phenylene, polypyrrole, polythiophene and derivatives thereof, and polyaniline and derivatives thereof.

There are two principal methods for processing conductive polymers into desired parts, fibers, films, etc.: melt processing and solution processing. Melt processing is a versatile processing method, whereas solution processing is applicable mainly to the production of fibers and films but not for the production of thick shaped articles. However, the processing and doping of most polymers which are intrinsically conductive involve problems with respect to handling, stability, homogeneity, etc., of the materials.

Polyaniline and derivatives thereof are technically and commercially promising intrinsically conductive polymers. An aniline polymer is composed of aniline units, the nitrogen atom of which is bonded to the carbon in the p-position of the phenyl ring of the next unit. Unsubstituted polyaniline may occur in a plurality of forms, including leucoemeraldine, protoemeraldine, emeraldine, nigraniline, and toluprotoemeraldine.

Sulfonic acid or derivatives thereof are often used as doping agents for polyaniline. Preferably, the polyaniline doping agent is dodecylbenzenesulfonic acid (DBSA), a derivative of sulfonic acid (cf., for example, patent publications WO-9010297 and U.S. Pat. No. 5,002,700).

In order to improve the electrical, optical and mechanical properties of conductive polymer blend/composites and thereby to expand their range of use, efforts have been made to develop blend/composite materials comprising an intrinsically conductive polymer, a doping agent, and a thermoplastic polymer matrix which would give the blend/composite certain required mechanical properties.

In the preparation of polymer blends, efficient blending of the components is essential for the attainment of a satisfactory end result. It is known that one factor having a decisive effect on miscibility is the molar masses of the polymers, i.e. polymers having a lower molar mass blend better with each other.

The effect of the polymerization conditions of chemical polymerization and, for example, the effect of the oxidizing agent to aniline ratio on the properties of polyaniline, such as its electrical conductivity, yield, elemental composition, and degree of oxidation, have been investigated and described in, for example, the following publications: Pron et al., Synthetic Metals 1988, Vol. 24, p. 193; Armes et al., Synthetic Metals 1988, Vol. 22, p. 283; Asturias et al., Synthetic Metals 1989, Vol. 29, E157. The effect of the conditions of chemical polymerization on the inherent viscosity of polyaniline, which correlates with the molecular weight of the polymer, have been investigated and explained by Yong Cao et al. in Polymer, 1989, 30, Dec. This article discusses, among other things, the effects of oxidizing agents and protonic acids, the aniline to oxidizing agent molar ratio, pH, polymerization temperature and polymerization time, particularly with respect to the viscosity and conductivity of the polymer. The polymerization of aniline according to the methods of this article was carried out in a conventional manner either by adding a solution of HCl and oxidizing agent (the oxidizing agent being, for example, $(NH_4)_2S_2O_8$, $K_2Cr_2O_7$, $KIO_3$, $FeCl_3$, $KMnO_4$, $KBRO_3$, $KClO_3$ and $H_2O_2$ into a reaction vessel which containing aniline, or by adding the oxidizing agent into a reaction vessel which contained a solution of aniline and HCl. By varying the parameters mentioned above, polyanilines of different yields, viscosities and conductivities were obtained.

SUMMARY OF THE INVENTION

According to the method of the present invention it is possible to control, in a new and surprising manner, the molar mass, i.e. molecular weight, of polyaniline during polyaniline synthesis. The control of the molecular weight of polyaniline in connection with polymer synthesis is, according to this invention, characterized by that aniline and an oxidizing agent are added to a reaction medium separately, in a gradual manner.

BRIEF DESCRIPTION OF THE DRAWINGS

These and other objects, features and many of the attendant advantages of the invention will be better understood upon reading of the following detailed description when considered in connection with the accompanying drawings wherein.

DETAILED DESCRIPTION OF THE INVENTION

The invention is described in greater detail in the following detailed description, including the Examples and Tables provided herein. However, the following detailed description must not be taken as limiting to the present invention, since it is intended only to illustrate certain preferred and exemplary embodiments of the present invention.

According to the present invention, it has now been observed, surprisingly, that the viscosity of polyaniline, and thereby its molecular weight, can be affected simply by modifying the conventional polymerization method according to which all the aniline to be polymerized, the protonic acid, and possibly also the oxidizing agent are introduced simultaneously into the reaction vessel and the mixture is allowed to polymerize for a desired period of time at a controlled temperature. The polymerization reaction itself is strongly exothermal, and therefore the polymerization temperature should be regulated by using appropriate cooling systems.

According to the present invention, the polymerization of aniline is thus carried out, so that the components participating in the polymerization reaction, i.e. the aniline monomer-HCl basic material and the oxidizing agent are introduced into the polymerization vessel gradually. In practice this is done by feeding the components through separate feeder pipes into the polymerization vessel, in which case it is possible to regulate the feeding speeds of the components separately. The regulation of feeding speeds of the components affects the molecular weight of the polyaniline formed.

The preferred oxidizing agent generally used in the aniline polymerization according to the present invention is ammonium peroxysulfate. Oxidizing agents conventionally used in the production of polyaniline can be used in the present inventive method. Exemplary of such oxidizing agents are besides ammonium peroxysulfate, $K_2Cr_2O_7$, $KIO_3$, $FeCl_3$, $KMnO_4$, $KBrO_3$, $KClO_3$ and $H_2O_2$. The molar ratio of oxidizing agent to aniline can be varied within a range of about 0.4–1.50, and most 1.00–1.50 but preferably it is about 1.15–1.25. When the oxidizing agent to aniline ratio is 1.25, a viscosity on the average lower than with a ratio of 1.15 is obtained. An excessive amount of oxidizing agent will, as is known Andreatta et.al., Polymer 1989, spoil the aniline material. The polymerization temperature in the method according to the invention may vary within a range of about −20 to +60 ° C. It has been observed, however, that a preferable temperature is about −10° to 25° C. and the most preferable approximately −5° to 5° C.

Figure 1:
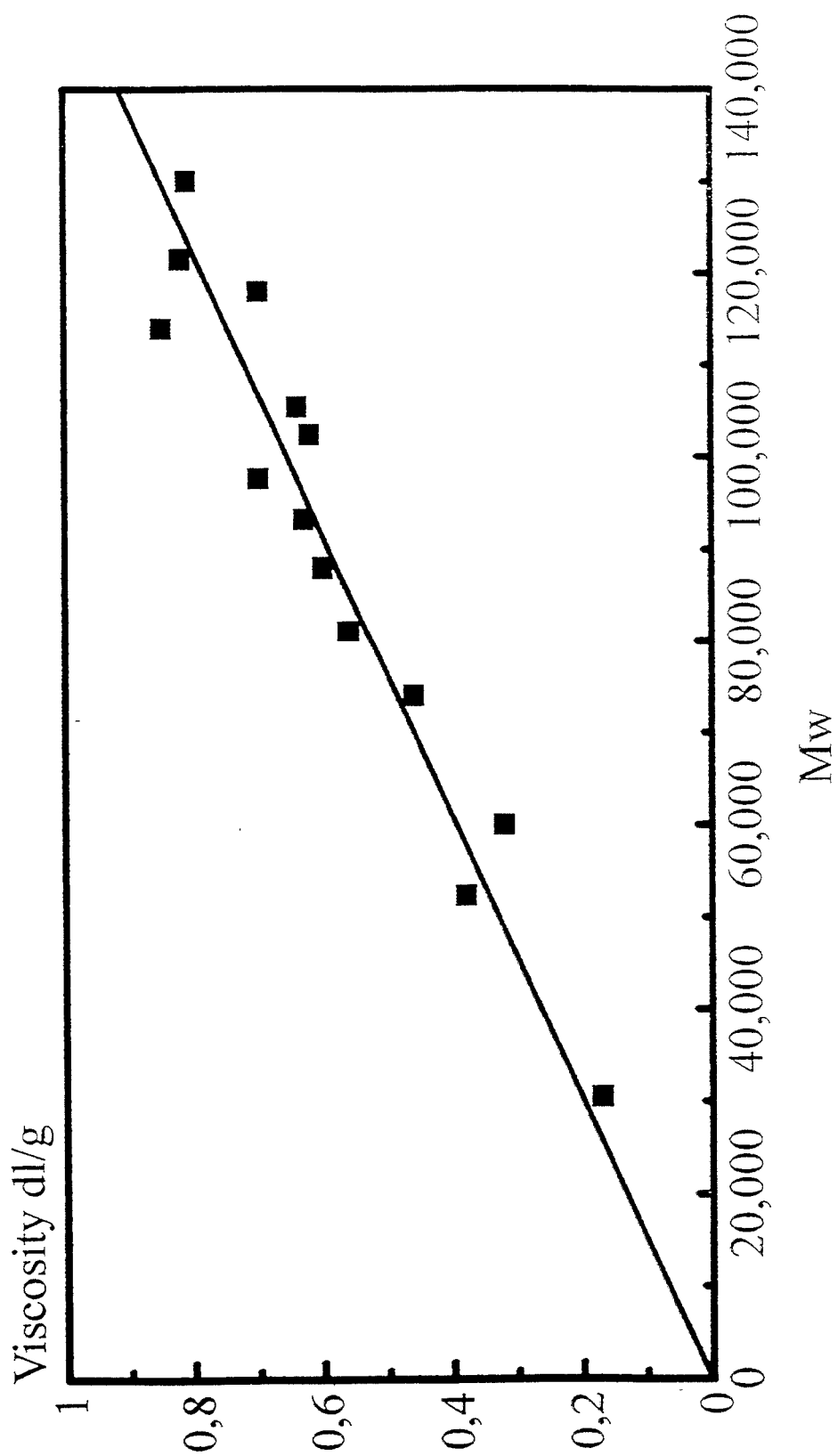
FIG. 1 is a graphic representation of the ratio of the molecular weight $M_w$ of polyaniline to its viscosity $\eta$. The viscosity was measured in a 0.1% wt. polyaniline solution in 97% sulfuric acid and is expressed in dl/g.
Figure 2:
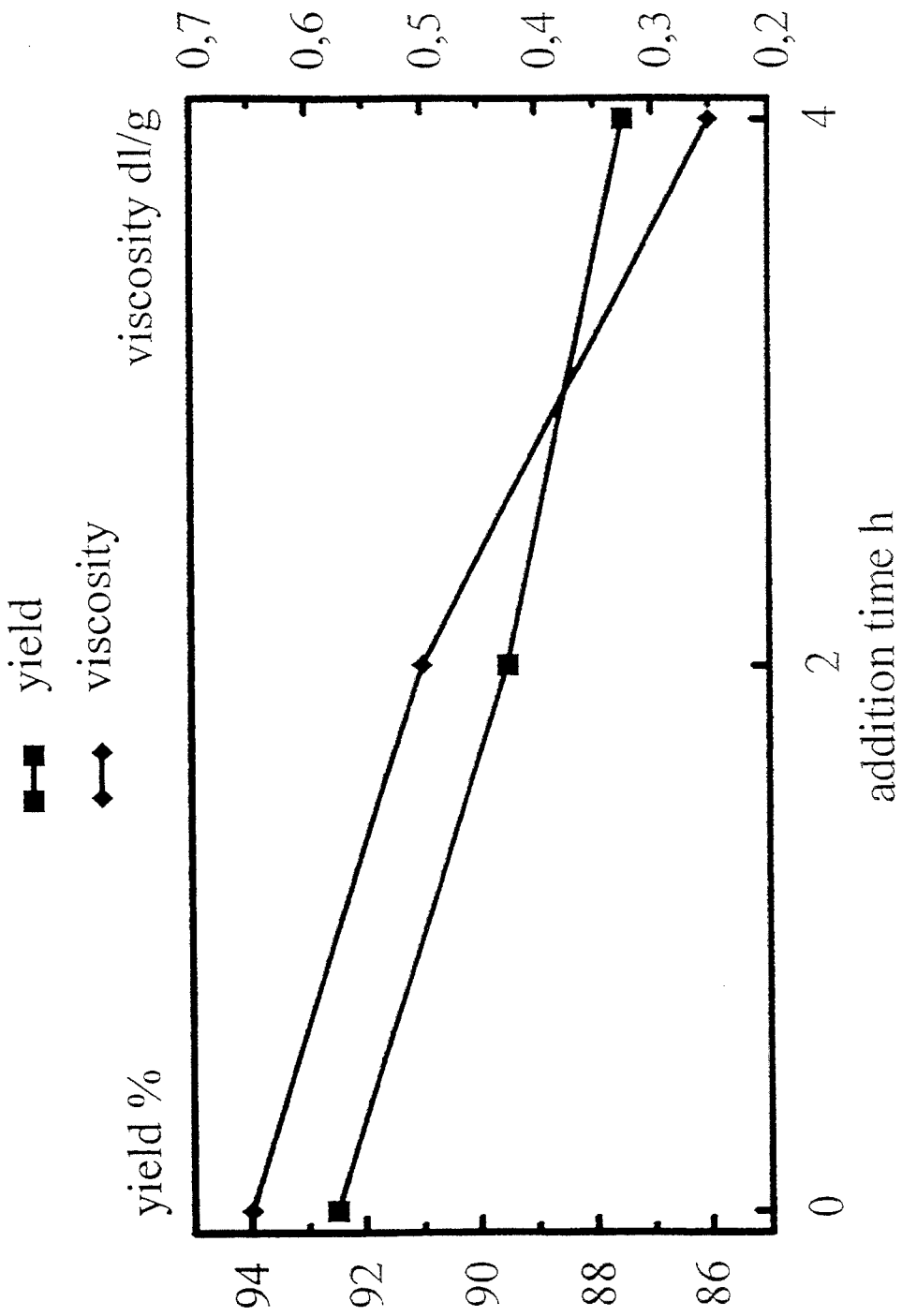
FIG. 2 shows that as the feeding period of aniline increases the viscosity of the resulting polyaniline decreases, and a sharper turn towards a decrease is achieved as the feeding period increases from 2-4 hours (oxidant:aniline ratio=1.15). Indeed, the yield also decreases somewhat, but during the 2-4 hour feeding period range the decrease is quite small. The oxidizing agent, i.e. ammonium peroxysulfate, was added to the mixture during the course of 4 hours.
Figure 3:
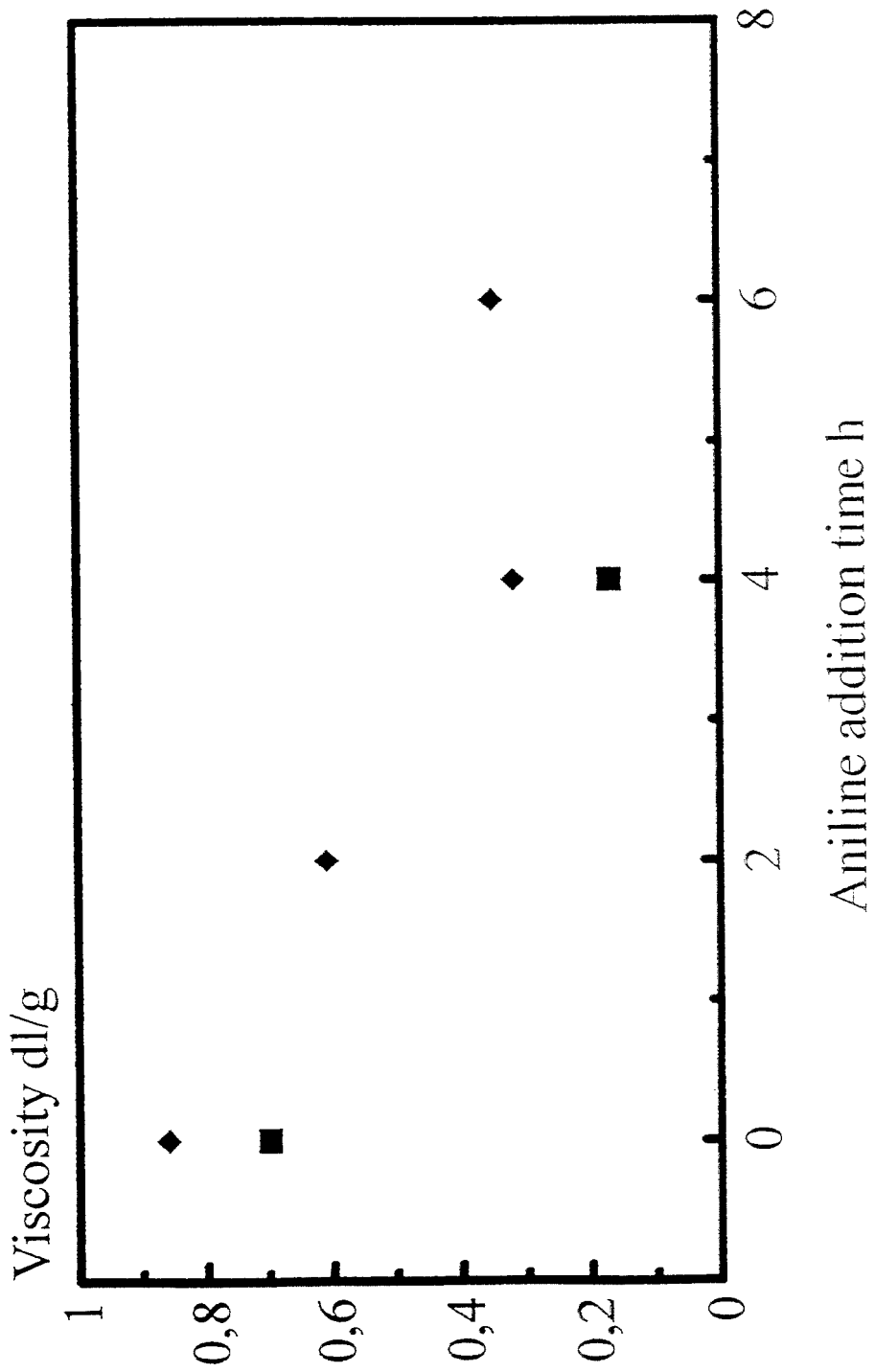
FIG. 3 shows the viscosity as a function of the aniline feeding time; the experimental points indicated by squares describe the oxidizing agent to aniline molar ratio 1.25 and those indicated by a lozenge the molar ratio 1.15. It is observed, that a lower viscosity is obtained using a larger amount of oxidizing agent.

As a result of the investigations carried out in connection with the present invention it has been demonstrated that there prevails a nearly linear relationship between the viscosity and the molecular weight of polyaniline. The viscosity (dl/g) is measured from a solution which contains 0.1% wt. polyaniline in 97% sulfuric acid. In the appended FIG. 1 this proportionality is shown graphically.

The feeding times of aniline and oxidizing agent according to the method of the present invention may vary up to several hours. It has been observed, that a preferred feeding time is from a couple of hours to several hours, depending on the desired molar mass of polyaniline. When the feeding time of aniline is changed, for example from about 2 to 4 hours, the feeding speed of the oxidizing agent being constant, the viscosity is almost cut in half. However, as the feeding time increases further, a corresponding decrease in viscosity will no longer occur. The oxidizing agent is also added during the course of several hours, preferably the feeding time is approximately 4 hours. The factor having the most significant effect, however, on the molar mass is the control of the feeding speed of aniline.

Comparative Example A (Outside of the Invention)

The polymerization of aniline in this comparative example was carried out in a conventional manner by adding the oxidizing agent, ammonium peroxysulfate, into a reaction vessel containing a solution of aniline and 1.2M HCl. The ammonium peroxysulfate was added during 4 h the oxidizing agent to aniline ratio being 1.15. The polymerization temperature was maintained at 4° C. After the polymerization was completed, the solution was filtered and the polyaniline complex was washed with water and ethanol. The polyaniline complex was treated with a dilute (1%) ammonia solution, whereupon the emeraldine base form of polyaniline was obtained. The polymer was washed with water and ethanol and dried in vacuo at 60° C. The viscosity (dl/g) of the formed polyaniline was measured in a 0.1% wt. solution of 97% sulfuric acid. The viscosity of polyaniline was 0,86 dl/g.

Examples 1–3

Aniline and oxidizing agent were fed into the polymerization vessel containing 1.2 M HCl solution from separate feed pipes; the oxidizing agent used was ammonium peroxysulfate at an oxidizing agent to aniline molar ratio of 1.15. The polymerization temperature was maintained at 4° C. The aniline was added during 2 h (Example 1), 4 h (Example 2), 6 h (Example 3), and the ammonium peroxysulfate during 4 h (Example 1), 4 h (Example 2) and 6 h (Example 3). After the polymerization was completed the solution was filtered and the polyaniline complex was washed with water and ethanol. The polyaniline complex was treated with a dilute (1%) ammonia solution, whereupon polyaniline of the emeraldine base form was obtained. The polymer was washed with water and ethanol and dried in vacuo at 60° C. The viscosity (dl/g) of the formed polyaniline was measured from a 0.1% wt. solution in 97% sulfuric acid. The results are shown in Table 1.

TABLE 1

Viscosity of polyaniline as a function of the feeding times of aniline and ammonium peroxysulfate, the molar ratio of oxidizing agent to aniline being 1.15.

| Experiment | $t_{ANI}$ (h) | $t_{APS}$ (h) | $\eta_{PANI}$ (dl/g) |
|---|---|---|---|
| A | 0 | 4 | 0,86 |
| 1 | 2 | 4 | 0.61 |
| 2 | 4 | 4 | 0.32 |
| 3 | 6 | 6 | 0.35 |

Abbreviations used:
$t_{ANI}$ = aniline feeding period
$t_{APS}$ = ammonium peroxysulfate feeding period
$\eta_{PANI}$ = polyaniline viscosity Examples 4–6

Aniline polymerization was performed according to Examples 1–3, but the molar ratio of oxidizing agent to aniline was 1.25. The aniline was added during 0 h (Example 4, a comparative example), 2 h (Example 5), 4 h (Example 6) and the oxidizing agent during 4 h (Example 4), 2 h (Example 5) and 4 h (Example 6). The viscosity was measured as in Examples 1–3, and the results are shown in Table 2.

TABLE 2

Viscosity of polyaniline as a function of the feeding times of aniline and ammonium peroxysulfate, the molar ratio of oxidizing agent to aniline being 1.25.

| Experiment | $t_{ANI}$ (h) | $t_{APS}$ (h) | $\eta_{PANI}$ (dl/g) |
|---|---|---|---|
| 4 | 0 | 4 | 0.70 |
| 5 | 2 | 2 | 0.24 |
| 6 | 4 | 4 | 0.17 |

Abbreviations used:
$t_{ANI}$ = aniline feeding period
$t_{APS}$ = ammonium peroxysulfate feeding period
$\eta_{PANI}$ = polyaniline viscosity It can clearly be seen from the examples and tables presented above and from the appended figures that during polymerization of aniline it is possible to control the molar mass of polyaniline by regulating the speeds at which the oxidizing agent used for the polymerization and the aniline are fed into the polymerization reactor. Especially by slowing down the feeding speed of aniline, a polyaniline having a lower viscosity and thereby a lower molar mass is obtained. The method is simple and it does not have significant adverse effects on the polymer yield or other properties of the polymer when the feeding periods involved are in the order of a few hours (e.g., up to about 6 hours).

Each of the publications and patents referred to hereinabove, are expressly incorporated herein by reference in their entirety.

What is claimed is:

1. In a method for producing a polyaniline by polymerizing aniline in a reaction mixture in the presence of an oxidizing agent, the improvement comprising the step of:

adding the aniline and the oxidizing agent to the reaction mixture separately in a gradual manner at a temperature of about −20° C. to about 460° C. over a time period of up to about 6 hours, in a molar ratio of the added oxidizing agent to the added aniline of about 0.4 to 1.50.

2. The method according to claim 1, wherein the aniline and the oxidizing agent are added to the reaction mixture simultaneously.

3. The method according to claim 1, wherein the molar mass of the polyaniline produced is decreased by increasing the time period over which the aniline and the oxidizing agent are added to the reaction mixture, provided that the time period for the addition of the aniline is up to about 4 hours.

4. The method according to claim 1, wherein the time period over which the aniline and the oxidizing agent are added to the reaction mixture is up to about 4 hours.

5. The method according to claim 1, wherein the time period over which the aniline is added to the reaction mixture is about 2 to 4 hours.

6. The method according to claim 1, wherein the molar ratio of the oxidizing agent to the aniline added to the reaction mixture is within a range of about 1.00–1.50.

7. The method according to claim 1, wherein the molar ratio of the oxidizing agent to the aniline added to the reaction mixture is within a range of about 1.15–1.25.

8. The method according to claim 1, wherein the oxidizing agent used is ammonium peroxysulfate.

9. The method according to claim 1, wherein the aniline is polymerized in an acid solution to give the polyaniline.

10. The method according to claim 1, wherein the aniline is polymerized at a temperature which is within a range of about −10° C. to +25° C.

11. The method according to claim 1, wherein the polymerization occurs at a temperature of about −5° C. to 5° C.

12. The method according to claim 1, wherein as the time period over which the aniline is added to the reaction mixture is increased, over a time period of up to 4 hours, a polyaniline having a decreased molar mass is obtained.

13. The method of claim 1, wherein the oxidizing agent is selected from the group consisting of $(NH_4)_2S_2O_8$, $K_2Cr_2O_7$, $KIO_3$, $FeCl_3$, $KMnO_4$, $KBrO_3$, $KClO_3$ and $H_2O_2$.

* * * * *

UNITED STATES PATENT AND TRADEMARK OFFICE
CERTIFICATE OF CORRECTION

PATENT NO. : 5,436,317
DATED : July 25, 1995
INVENTOR(S) : Järvinen et al.

It is certified that error appears in the above-indentified patent and that said Letters Patent is hereby corrected as shown below:

Column 6, line 13, change "about -20° C. to about 460° C." to --about -20° C. to about +60° C.--

Signed and Sealed this

Second Day of April, 1996

Attest:

BRUCE LEHMAN

Attesting Officer

Commissioner of Patents and Trademarks